(12) United States Patent
Jackson et al.

(10) Patent No.: US 6,763,767 B2
(45) Date of Patent: Jul. 20, 2004

(54) RAILCAR MOVER HAVING NEGATIVE CAMBERED RAIL WHEELS

(75) Inventors: E. Don Jackson, Lee's Summit, MO (US); Scott Michael Higgins, De Soto, KS (US)

(73) Assignee: Central Manufacturing, Grandview, MO (US)

( * ) Notice: Subject to any disclaimer, the term of this patent is extended or adjusted under 35 U.S.C. 154(b) by 0 days.

(21) Appl. No.: 10/298,028

(22) Filed: Nov. 15, 2002

(65) Prior Publication Data

US 2004/0094062 A1 May 20, 2004

(51) Int. Cl.⁷ ............................................... B61C 11/00
(52) U.S. Cl. ................ 105/72.2; 105/215.2; 105/163.2; 104/244
(58) Field of Search ............................. 105/72.2, 215.1, 105/215.2, 163.2; 104/244, 243, 242; 295/36.1, 8.5, 1, 27

(56) References Cited

U.S. PATENT DOCUMENTS

| | | | |
|---|---|---|---|
| 1,952,043 A | | 3/1934 | Buckwalter |
| 2,046,448 A | * | 7/1936 | Buigne ........................ 105/165 |
| 2,727,780 A | | 12/1955 | Lorig et al. |
| 2,842,393 A | | 7/1958 | Lorig |
| 2,979,359 A | * | 4/1961 | Tripp ......................... 295/8.5 |
| 3,269,331 A | * | 8/1966 | Thompson .................. 105/72.2 |
| 3,804,025 A | * | 4/1974 | Elliott ........................ 105/72.2 |
| 3,808,693 A | * | 5/1974 | Plasser et al. ............. 33/523.2 |
| 3,945,326 A | | 3/1976 | Seifert |
| 4,058,065 A | | 11/1977 | Seifert |
| 4,497,257 A | * | 2/1985 | White, Jr. ................... 105/72.2 |
| 6,298,792 B1 | * | 10/2001 | Jackson, Jr. ............. 105/215.1 |

FOREIGN PATENT DOCUMENTS

| | | |
|---|---|---|
| DE | 821163 | 7/1949 |
| FR | 685306 | 11/1929 |

* cited by examiner

Primary Examiner—Mark T. Le
(74) Attorney, Agent, or Firm—Hovey Williams LLP

(57) ABSTRACT

A dual use roadway or railroad travel vehicle such as a railcar mover (10) which includes an inner set (24) of wheel assemblies (28, 30) designed for alternate roadway or rail travel, together with fore and aft rail wheel assemblies (32, 34) which may be alternately retracted for roadway travel or lowered for rail travel. The wheel assemblies (32, 34) each have a pair of rail wheels (36, 38) mounted spindles (48) so that the rotational axes A of the wheels (36, 38) are oriented at an oblique angle α of less than 6° relative to the horizontal H; this wheel orientation, together with a rail wheel geometry including a rim surface (40, 42) parallel with the associated rotational axis A and a reduced radius of curvature R between the rim surface (40, 42) and the flange (44, 46), significantly decreases the problem of rail wheel climb encountered with conventional movers (10), while also reducing flange wear.

21 Claims, 2 Drawing Sheets

US 6,763,767 B2

RAILCAR MOVER HAVING NEGATIVE CAMBERED RAIL WHEELS

BACKGROUND OF THE INVENTION

1. Field of the Invention

The present invention is concerned with vehicles designed for alternate travel on a roadway or railroad rails (e.g., railcar movers used in industrial settings for short movements of railcars), and improved rail wheel assemblies which may be used with such vehicles. These vehicles are equipped with wheel assemblies for engaging a roadway during roadway travel, and for engaging railroad rails during railroad travel, as well as rail wheel assemblies which may be selectively lowered to engage and ride upon the railroad rails. More particularly, the invention is concerned with such vehicles and rail cars, as well as improved rail wheel assemblies finding particular utility in these vehicles. Broadly speaking, the improved rail wheel assemblies of the invention are negative cambered or inwardly inclined such that the rotational axes thereof are at small (less than 6°) oblique angles relative to the horizontal so that the upper ends of the rail wheels are slightly inboard of the lower ends thereof adjacent the rail.

2. Description of the Prior Art

A number of dual use vehicles have been proposed in the past and which are capable of traveling on regular roadways or alternately upon railroad rails. Generally speaking, these vehicles include more or less regular roadway wheels which also will travel on rails, as well as selectively usable rail wheels which may be lowered onto rails as needed.

One class of dual use vehicle of this type is railcar movers. These are used in the context of industrial plants or grain elevators for example, in order to move one or more railcars short distances within the associated rail yards. Railcar movers are considerably less expensive than standard locomotives, but nevertheless capable of moving rail cars the short distances required. Existing railcar movers are equipped with various sizes of rail wheels (e.g., 22 inch) having a slightly different flange configuration than the rail wheels used with railcars.

A problem with conventional railcar movers is known as "wheel climb", which refers to the tendency of the rail wheels to ride up on the rails when a curve and/or side load is encountered. This problem can be so severe that the railcar movers cannot negotiate some tight curves, or the load on the mover must be reduced to avoid derailment.

The following references depict various rail wheel assemblies which employ inclined rail wheels: U.S. Pat. Nos. 3,945,326, 4,058,065, 1,952,043, 2,72,780 and 2,842,393; and French Patent No. 685,306 and German Patent No. 821,163.

SUMMARY OF THE INVENTION

The present invention overcomes the problems outlined above and provides a vehicle designed for alternate travel on a roadway or railroad rails, the vehicle including a frame, and a dual use set of wheel assemblies oriented for engaging the roadway during roadway travel, and for alternately engaging the rails during railroad travel. The vehicle also has a set of rail wheel assemblies, and a rail wheel shifting mechanism operable to move the rail wheels into a tracking position in engagement with the rails for the railroad travel, and to move the rail wheels to a retracted position for roadway travel. The improved rail wheel assemblies of the invention include a mounting assembly for at least certain of rail wheels serving to orient the rotational axes of the associated rail wheels at small oblique angle relative to the horizontal with the inner margins of the upper ends of the rail wheels being inboard of the lower ends thereof adjacent the rails. This has been found to significantly inhibit the rail wheel climb.

In more detail, the rail wheel set of the invention comprises two pairs of rail wheels, each of the rail wheels of each pair having a mounting assembly associated therewith. This mounting assembly preferably includes a fixed, obliquely oriented spindle which is supported upon a shaft; the shaft is in turn mounted for up and down pivotal movement, thereby permitting the rail wheels to move between the retracted, roadway travel position, and the lowered railroad travel position.

The roadway/railroad wheel set arc preferably in the form of two pairs of wheels mounted between the fore and aft rail wheel pairs. The wheels are conventional and include pneumatic tires. At least one set of these wheel pairs is powered so as to permit movement of the vehicle both on a roadway and on rails. Further, in order to provide roadway steering, the front and/or rear pair of wheels is steerable.

DETAILED DESCRIPTION OF THE PREFERRED EMBODIMENT

Figure 1:
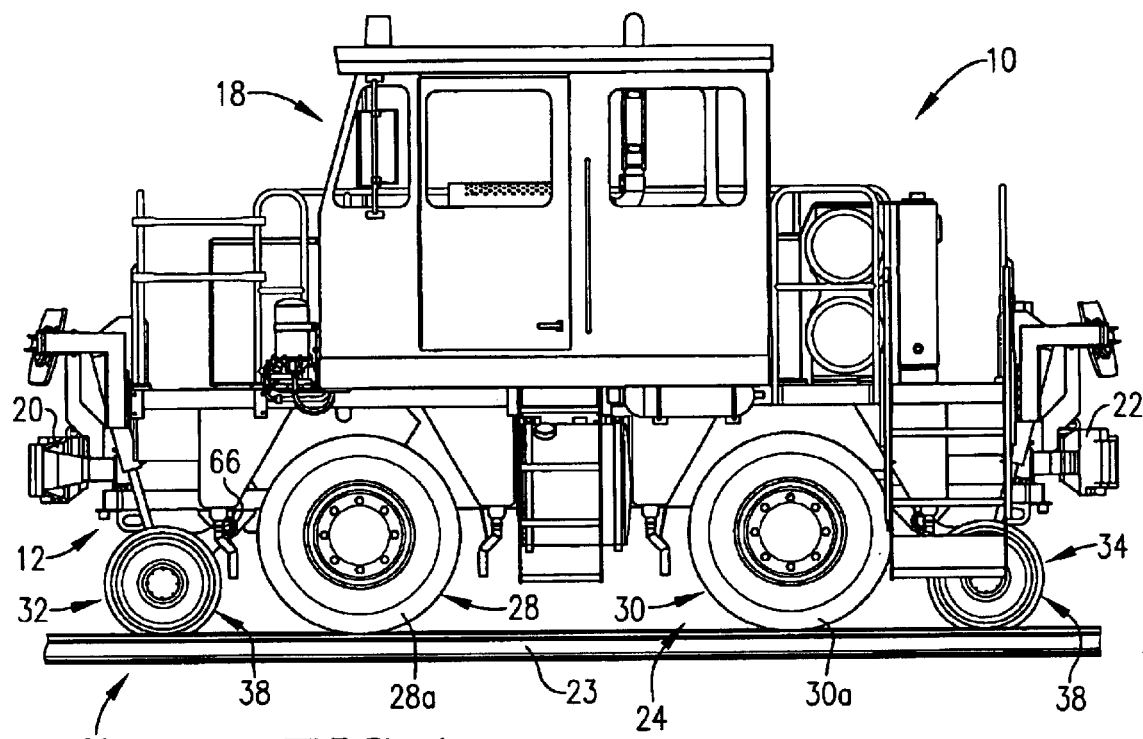
FIG. 1 is an elevational view of a railcar mover equipped with the improved rail wheels of the invention.

Turning now to the drawings, a railcar mover 10 is depicted in FIG. 1. Broadly speaking, the mover 10 includes a frame assembly 12 having fore and aft laterally extending supports 14 with the frame assembly supporting an operator cab 18 and associated equipment, as well as front and rear rail car couplers 20, 22. The mover 10 is supported for alternate travel on a roadway or upon railroad rails 23 by means of an inner wheel assembly set 24 as well as a set of rail wheel assemblies broadly referred to by the numeral 26. As will be apparent, the railcar mover 10 is entirely conventional except for the design and operation of the rail wheel assembly set 26; accordingly, the ensuing discussion will be primarily directed to the latter features.

The inner wheel set 24 is made up of two pairs of inner wheels 28, 30, each wheel pair including laterally spaced apart pneumatic tires 28a and 30a. As illustrated in FIG. 1, the tires 28a and 30a are spaced apart and designed so as to ride upon the rails 23 and to provide driving force for the mover 10. To this end, the front and rear pairs 28, 30 are powered by a diesel engine carried by the mover 10. Additionally, the tires 28a, 30a serve as roadway wheels for roadway travel (the front pair 23 of the wheels are steerable for such travel). Again, the design and construction of the inner wheel set 24 is well known to those skilled in the art and thus need not be described in detail.

Figure 2:
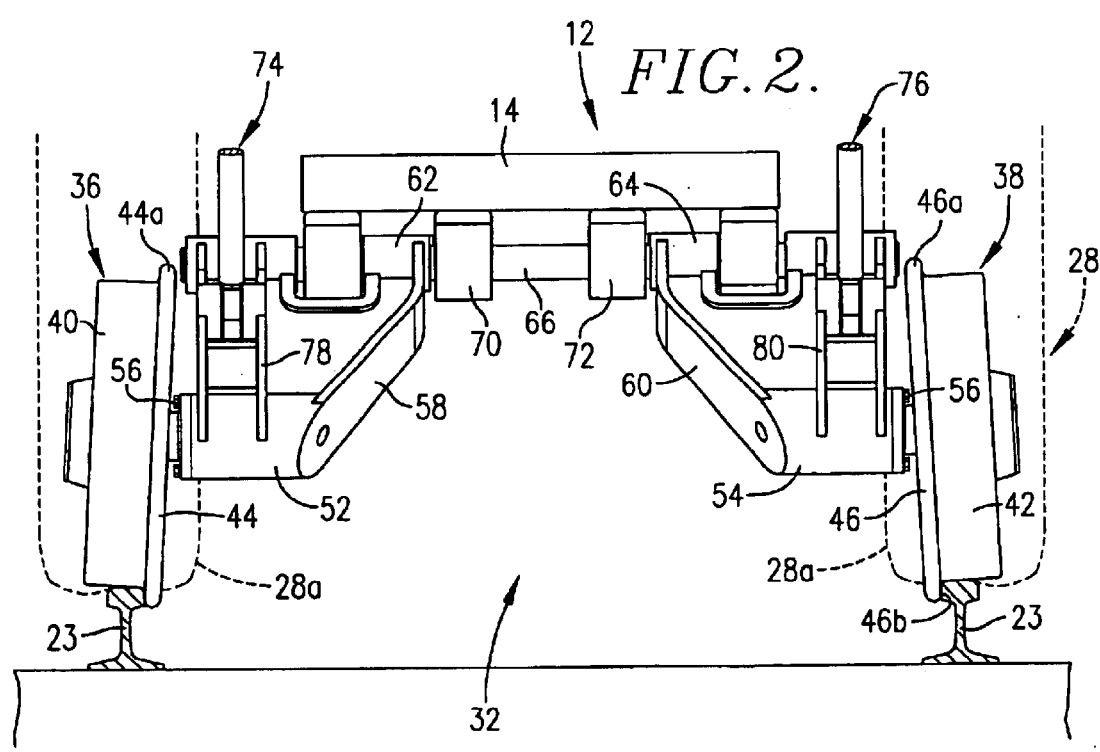
FIG. 2 is a fragmentary front view of a pair of rail wheels in accordance with the invention, shown during use of thereof while the railcar mover is traveling on conventional railroad rails.

The rail wheel set 26 is made up of fore and aft rail wheel assemblies 32 and 34 which are respectively located ahead of and behind the inner wheel pairs 28, 30. Referring to FIG. 2, it will be observed that the assembly 32 includes a pair of laterally spaced apart rail wheels 36, 38 each presenting a circumferential rail-engaging rim surface 40, 42 as well as a continuous inner flange 44, 46. The individual rail wheels 36, 38 are mounted on a fixed spindle 48 (see FIG. 3) and are rotatable about the spindle 48 via bearings 50. Each spindle 48 defines the rotational axis A of the associated wheel, with such axis A oriented at an oblique angle a relative to the horizontal H. This angle a is less than 6°, more preferably less than about 5°, and still more preferably from about 1.5–4°, and most preferably about 3°. The oblique rotational axes of the rail wheels 36, 38 is such that the inner margins 44a and 46a of the upper ends of the rail wheels are inboard of the lower ends thereof adjacent the rails 23. However, in preferred practice there is no toe-in or camber of the rail wheels 36, 38, i.e., the plane of the rail wheels is essentially parallel with the longitudinal axes of the rails 23. Finally, it will be apparent from the foregoing that the angular relationship between each spindle 48 and the associated rail wheel 36, 38 is fixed, and that the rotational axes A of the rail wheels 36, 38 are fixed when the latter are traveling upon the rails 23.

Figure 3:
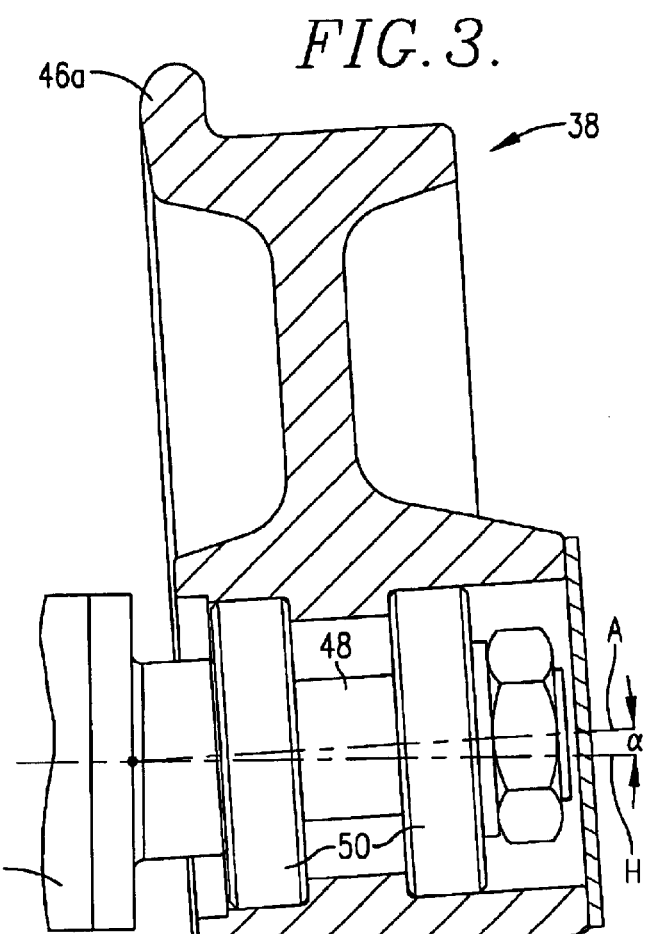
FIG. 3 is a vertical sectional view of a rail wheel in accordance with the invention, illustrating the preferred spindle mounting arrangement for the rail wheel.

The forward rail wheel assembly 32 is mounted so as to permit selective movement thereof between the lowered position illustrated in FIGS. 1–3 where the rail wheels engage and ride upon the rails 23, and an upper, retracted position (not shown) where the rail wheels 36, 38 are above the tires 28a, 30a for roadway travel of the mover 10. In more detail, each of the spindles 48 is secured to a shaft 52, 54 by means of bolts 56, with the shafts in turn supported by upwardly extending, obliquely oriented pivot arms 58, 60. The arms 58, 60 are in turn connected to tubular mounts 62, 64, the latter being pivotally supported on stationary, laterally extending shaft 66. The shaft 66 is connected to frame support 14 by means of bearing assemblies 70, 72. A pair of piston and cylinder assemblies 74, 76 are provided for selective movement of the rail wheels 36, 38 between the respective positions thereof. Each assembly 74, 76 is associated with an individual rail wheel, i.e., the extensible rod of a respective assembly is secured to a corresponding shaft 52, 54 by means of a bracket 78, 80.

The aft rail wheel assembly 34 is identical with the assembly 32 and thus will not be described in detail, apart from noting that the individual rail wheels thereof are supported from rear frame support 14.

Figure 5:
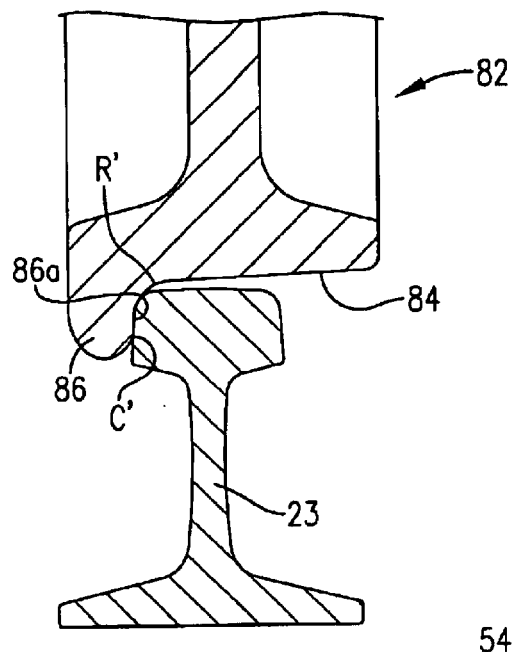
FIG. 5 is a view similar to that of FIG. 4, but depicting a conventional rail wheel.
Figure 4:
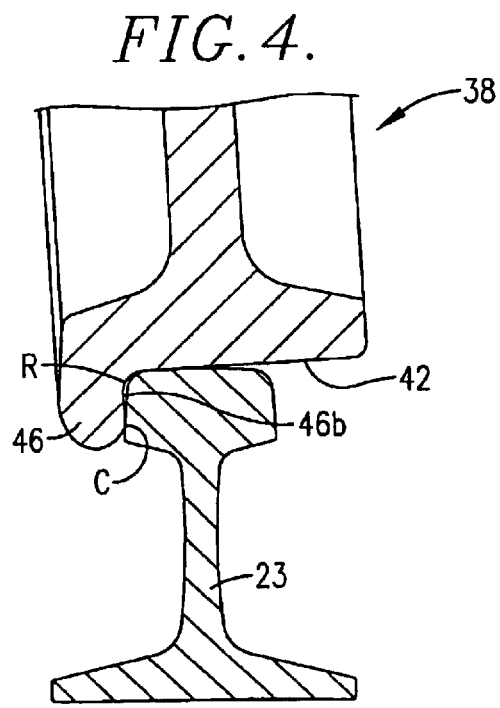
FIG. 4 is an enlarged, fragmentary, vertical sectional view of a preferred rail wheel, shown in operative engagement with a railroad rail.

Attention is next directed to FIGS. 4 and 5. FIG. 4 depicts the preferred rail wheel design of the present invention, whereas FIG. 5 illustrates a conventional rail wheel used in the context of railcar movers. Specifically, and referring to FIG. 4, it will be seen that the rim surface 42 of the exemplary rail wheel 38 is substantially parallel (usually within 1.5°) with the rotational axis A of the wheel. Moreover, the radius of curvature R between the rim surface 42 and the outer surface 46b of rim 46 is from about 0.3–0.5 inches, more preferably from about 0.350–0.425 inches, and most preferably about 0.375 inches. These design features are to be contrasted with a prior art rail wheel 82 depicted in FIG. 5. The wheel 82 has rim surface 84, flange 86, outer flange surface 86a and radius of curvature R'. In this case, however, the rim surface 84 is oriented at an oblique angle of 2.86° relative to the horizontal rotational axis of the wheel 82, and the radius of curvature R' is significantly greater, namely 0.6875°.

As explained previously, use of conventional rail wheels in railcar movers can lead to the phenomenon of wheel climb, particularly when the mover the attempts to negotiate curves. As illustrated in FIG. 5, the design of the typical rail wheels does nothing to counteract this problem, and in fact contributes to it. However, when using the negative cambered rail wheels of the invention, the noted wheel geometry creates a more even contact between the parts of the rail wheel and the rail 23, thereby eliminating or substantially minimizing wheel climb.

In addition, it will be observed that the point of contact C (FIG. 4) between the inclined rail wheel flange and the rail 23 is lower and beneficially positioned such that a rolling rather than a sliding condition exists between the flange and rail. This is to be contrasted with the prior art where the point of contact C' (FIG. 5) is higher and induces a sliding condition. The improved contact point C and the associated rolling action owing to the wheel angle reduces flange wear as well as the forces that cause wheel climb.

While in a preferred form, negative cambered rail wheels are employed in conjunction with alternate travel vehicles, it will be appreciated that the invention is not so limited, particularly in the construction of the rail wheel assemblies per se. Furthermore, the invention is not in any way limited to the particular details of the described mover 10. For example, different sizes of rail wheels can be used; other mechanical arrangements for raising and lowering the rail wheels can be used, such as telescopic or linear mechanisms; and the axle assemblies supporting the rail wheels can be of various designs, such as those known in the art having central pivots.

We claim:

1. In a vehicle designed for alternate travel on a roadway or railroad rails, said vehicle including a frame, a set of wheel assemblies oriented for engaging said roadway during roadway travel, and for engaging said rails during railroad travel, a set of rail wheel assemblies each having rail wheels including an upper end a lower end and an inner margin, and a rail wheel shifting mechanism operable to move the rail wheels between a tracking position in engagement with said rails for said railroad travel, and a retracted position for said roadway travel, the improvement which comprises a mounting assembly for at least certain of said rail wheels serving to orient the rotational axes thereof at a predetermined oblique angle relative to the horizontal when said angled rail wheels are in said retracted position thereof, and, when said angled rail wheels are in the tracking position thereof, the angled rail wheels are oriented with the inner margins of the upper ends of the rail wheels inboard of the lower ends thereof adjacent the rails; wherein, said angle is less than 6°.

2. The vehicle of claim 1, said angle being from about 1.5 to 4°.

3. The vehicle of claim 1, said angle being about 3°.

4. The vehicle of claim 1, said rail wheel set comprising two pairs of rail wheels, each of said rail wheels having a mounting assembly associated therewith.

5. The vehicle of claim 1, said wheel assemblies comprising pneumatic tires.

6. The vehicle of claim 1, said wheel assemblies being axially spaced from said rail wheels along the length of said vehicle.

7. The vehicle of claim 1, each of said certain rail wheels mounted on a fixed, obliquely oriented spindle.

8. The vehicle of claim 1, each of said certain rail wheels presenting a rim surface and a flange, said rim surface being substantially parallel with the rotational axes of the certain rail wheels.

9. The vehicle of claim 1, each of said certain rail wheels presenting a flange, there being a radius of curvature between the rim surface and flange, said radius of curvature being from about 0.3 to 0.5 inches.

10. The vehicle of claim 9, said radius of curvature being from about 0.350 to 0.425 inches.

11. The vehicle of claim 10, said radius of curvature being about 0.375 inches.

12. The vehicle of claim 1, said vehicle being a rail car mover.

13. The vehicle of claim 12, said rail car move including a frame, said rail wheels mounted on said frame for pivoting movement thereof between said tracking and retracted positions.

14. The vehicle of claim 12, there being two pairs of said rail wheels, a forward pair and a rearward pair, there being two pairs of said wheel assemblies located between said forward and rearward rail wheels pairs.

15. The vehicle of claim 1, said mechanism comprising a piston and cylinder assembly associated with each of said rail wheels.

16. A rail wheel assembly comprising:

a pair of laterally spaced apart rail wheels each designed to travel upon a railroad rail; and a mounting assembly for each of said rail wheels including an elongated spindle defining the rotational axis of the associated rail wheel, said axes being oriented at a predetermined oblique angle relative to the horizontal and from 1.5° to less than 6° so that the inner margins of the upper ends of the rail wheels are inboard of the lower ends thereof adjacent the rails, each of said rail wheels presenting a rim surface and a flange, there being a radius of curvature between the rim surface and flange said radius of curvature being 0.3 to 0.5 inches, the angular relationship between each spindle and the associated rail wheel being fixed.

17. The assembly claim 16, said angle being from 1.5 to 4°.

18. The assembly of claim 17, said angle being about 3°.

19. The assembly of claim 16, each of said rail wheels presenting a rim surface and a flange, said rim surface being substantially parallel with the rotational axis of the associated rail wheel.

20. The assembly of claim 16, said radius of curvature being from about 0.350 to 0.425 inches.

21. The assembly of claim 20, said radius of curvature being about 0.375 inches.

* * * * *